(12) United States Patent
Kudo (10) Patent No.: US 11,639,692 B2
(45) Date of Patent: May 2, 2023

(54) ENGINE IDLE REDUCTION CONTROL APPARATUS

(71) Applicant: SUBARU CORPORATION, Tokyo (JP)

(72) Inventor: Shinya Kudo, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 0 days.

(21) Appl. No.: 17/691,729

(22) Filed: Mar. 10, 2022

(65) Prior Publication Data

US 2022/0307431 A1    Sep. 29, 2022

(30) Foreign Application Priority Data

Mar. 25, 2021 (JP) ............................. JP2021-052039

(51) Int. Cl.
 *F02D 31/00* (2006.01)
(52) U.S. Cl.
 CPC ........ *F02D 31/001* (2013.01); *F02D 2200/70* (2013.01)
(58) Field of Classification Search
 CPC .......................... F02D 31/001; F02D 2200/70
 See application file for complete search history.

(56) References Cited

U.S. PATENT DOCUMENTS

2012/0226391 A1* 9/2012 Fryer ................. G01C 21/3407
 701/1
2013/0180500 A1 7/2013 Nishina

FOREIGN PATENT DOCUMENTS

JP         5608180 B2    9/2014

* cited by examiner

*Primary Examiner* — Grant Moubry
*Assistant Examiner* — Ruben Picon-Feliciano
(74) *Attorney, Agent, or Firm* — Troutman Pepper Hamilton Sanders LLP (57) ABSTRACT

An engine idle reduction control apparatus includes a first data acquiring unit, a detecting unit, a first determining unit, a control unit, and a second determining unit. The detecting unit is configured to detect a traffic circle, on the basis of traveling environment data acquired by the first data acquiring unit. The control unit is configured to execute an idle reduction, in a case where the first determining unit determines that a control condition for a pre-stop idle reduction control is satisfied. The second determining unit is configured to determine whether a prohibition condition for the pre-stop idle reduction control is satisfied, in a case where the traffic circle is detected. The control unit is configured to prohibit the idle reduction even in a case where the control condition is determined to be satisfied, on a condition that the prohibition condition is determined to be satisfied.

16 Claims, 8 Drawing Sheets

ENGINE IDLE REDUCTION CONTROL APPARATUS

CROSS-REFERENCE TO RELATED APPLICATION

The present application claims priority from Japanese Patent Application No. 2021-052039 filed on Mar. 25, 2021, the entire contents of which are hereby incorporated by reference.

BACKGROUND

The technology relates to an engine idle reduction control apparatus.

A pre-stop idle reduction control automatically stops an engine of an own vehicle before the own vehicle stops in a case where predetermined conditions are satisfied, with an aim to improve fuel consumption, reduce emissions of carbon dioxide, etc. For example, the predetermined conditions are that an accelerator pedal is released, a brake pedal is pressed, and a speed of the own vehicle is equal to or less than a predetermined vehicle speed (optionally, a voltage of a battery is equal to or greater than a predetermined battery voltage).

The pre-stop idle reduction control performs an idle reduction without exception in a case where the example conditions for the idle reduction described above are satisfied. There are some cases, however, where it is better not to stop the engine even in a case where the conditions for the idle reduction are satisfied, depending on an external environment.

For example, Japanese Patent (JP-B) No. 5608180 discloses a technique that variably sets, in response to the external environment, a vehicle speed at which the idle reduction is started. For example, the vehicle speed at which the idle reduction is started is set to be lower when a traffic light is green than when the traffic light is yellow or red. This makes it possible to smoothly reaccelerate an own vehicle following the deceleration in front of the traffic light, as compared with a case where the vehicle speed at which the idle reduction is started is solely set.

SUMMARY

An aspect of the technology provides an engine idle reduction control apparatus to be applied to a vehicle. The engine idle reduction control apparatus includes a first data acquiring unit, a detecting unit, a first determining unit, a control unit, and a second determining unit. The first data acquiring unit is configured to acquire, as traveling environment data, data on a traveling environment ahead of the vehicle. The detecting unit is configured to detect a traffic circle, on the basis of the traveling environment data acquired by the first data acquiring unit. The first determining unit is configured to determine whether a control condition which is predetermined for a pre-stop idle reduction control is satisfied. The control unit is configured to execute an idle reduction of an engine of the vehicle, in a case where the first determining unit determines that the control condition is satisfied. The second determining unit is configured to determine whether a prohibition condition for the pre-stop idle reduction control is satisfied, in a case where the detecting unit detects the traffic circle. The control unit is configured to prohibit executing the idle reduction even in a case where the first determining unit determines that the control condition is satisfied, on a condition the second determining unit determines that the prohibition condition is satisfied.

An aspect of the technology provides an engine idle reduction control apparatus to be applied to a vehicle. The engine idle reduction control apparatus includes a sensor and circuitry. The sensor is configured to acquire, as traveling environment data, data on a traveling environment ahead of the vehicle. The circuitry is configured to detect a traffic circle, on the basis of the traveling environment data acquired by the detector. The circuitry is configured to determine whether a predetermined control condition for a pre-stop idle reduction control is satisfied. Upon detecting the traffic circle, the circuitry is configured to determine whether a prohibition condition for the pre-stop idle reduction control is satisfied. Upon determining that only the control condition among the control condition and the prohibition condition is satisfied, execute an idle reduction of an engine of the vehicle. Upon determining the control condition and the prohibition condition are both satisfied, the circuitry is configured to prohibit executing the idle reduction.

BRIEF DESCRIPTION OF THE DRAWINGS

The accompanying drawings are included to provide a further understanding of the disclosure, and are incorporated in and constitute a part of this specification. The drawings illustrate embodiments and, together with the specification, serve to explain the principles of the technology.

DETAILED DESCRIPTION

A traffic circle or a roundabout is one of types of intersections. The traffic circle is an intersection in which three or more roads are coupled to one another via a one-way circular road. In principle, the traffic circle is provided with no traffic lights and there is no obligation to pause upon entering the circular road unless otherwise specified.

Accordingly, at the traffic circle, an own vehicle often enters the circular road at a very low speed without stopping the own vehicle.

Under such circumstances, an engine can automatically stop when a driver has pressed a brake pedal and a speed of the own vehicle thus becomes equal to or less than a vehicle speed at which an idle reduction is started, even in a case where the vehicle speed at which the idle reduction is started is set in response to an external environment as disclosed in JP-B No. 5608180. As mentioned above, there is no obligation to pause at the traffic circle upon entering the circular road. Accordingly, a driver or a control system causes the own vehicle to enter the circular road while adjusting the speed of the own vehicle by a brake operation and an accelerator operation.

If the stop of the engine and the restart of the engine are repeated upon entering the circular road of the traffic circle, the driver can feel clumsiness. Repeating the stop of the engine and the restart of the engine in a short period of time can deteriorate a fuel consumption as well. Further, the driver can feel a sense of discomfort if a start delay occurs upon pressing an accelerator pedal during a pre-stop idle reduction.

It is desirable to provide an engine idle reduction control apparatus that makes it possible to allow a vehicle having a pre-stop idle reduction control function to smoothly enter a traffic circle and travel at the traffic circle.

In the following, some example embodiments of the technology are described in detail with reference to the accompanying drawings. Note that the following description is directed to illustrative examples of the disclosure and not to be construed as limiting to the technology. Factors including, without limitation, numerical values, shapes, materials, components, positions of the components, and how the components are coupled to each other are illustrative only and not to be construed as limiting to the technology. Further, elements in the following example embodiments which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same reference numerals to avoid any redundant description. In addition, elements that are not directly related to any embodiment of the technology are unillustrated in the drawings.

Figure 1:
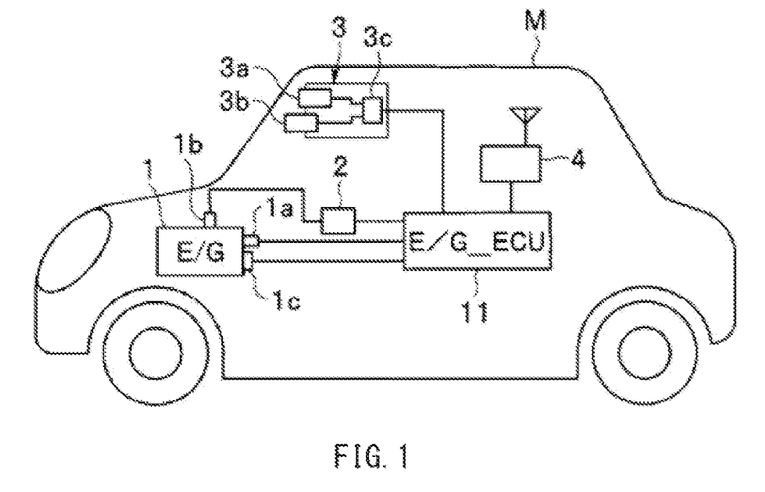
FIG. 1 is a diagram schematically illustrating a vehicle that includes an engine and having a pre-stop idle reduction control function.

Referring to FIG. 1, a vehicle or an own vehicle M includes an engine (E/G) 1. The engine 1 may have cylinders each including an injector 1a and an ignition plug 1b. Each of the ignition plugs 1b may be coupled to an igniter 2. The engine 1 may also include a starter motor 1c that activates the stopped engine 1.

The own vehicle M includes a vehicle-mounted camera 3. In one embodiment, the vehicle-mounted camera 3 may serve as a "traveling environment data acquiring unit", a first data acquiring unit", or a "detector". The vehicle-mounted camera 3 may include a stereo camera and an image processing unit (IPU) 3c. The stereo camera may have a main camera 3a and a sub-camera 3b. The image processing unit 3c may perform a predetermined process on image signals obtained from the main camera 3a and the sub-camera 3b. The main camera 3a and the sub-camera 3b may have a predetermined baseline length, and may be disposed at right and left symmetrical positions located across the middle in a vehicle width direction at an upper part of a windshield on a vehicle compartment side, such that images of a traveling environment ahead of the own vehicle M are captured.

The own vehicle M may include a navigation unit 4. The navigation unit 4 may have a GNSS (Global Navigation Satellite System) receiver and a roadmap database. The navigation unit 4 may estimate a position of the own vehicle M on the road map database, on the basis of data on a position of the own vehicle M received by the GNSS receiver.

The own vehicle M includes an engine control unit (E/G_ECU), or an engine ECU 11 that controls the engine 1. The engine ECU 11 may execute an engine control on the basis of an operation of an accelerator and an operation of a brake performed by a driver itself to cause the own vehicle M to travel. Alternatively, the engine ECU 11 may execute the engine control on the basis of a control system that operates the accelerator and the brake to cause the own vehicle M to travel.

The engine ECU 11 may be or may include a microprocessor. The microprocessor may include a central processing unit (CPU), a random-access memory (RAM), a read-only memory (ROM), a rewritable non-volatile memory, and peripheral devices. The rewritable non-volatile memory may be a flash memory, an electrically erasable programmable read-only memory (EEPROM), or the like. The ROM may contain a program, fixed data, etc., that are necessary for causing the CPU to execute each process. The RAM may be provided as a work area of the CPU, and may temporarily hold various pieces of data for the CPU. The CPU may encompass a microprocessor (MPU) and a processor.

The engine ECU 11 may calculate an optimum fuel injection amount to be supplied to each of the cylinders, and may determine an optimum ignition timing of each of the cylinders. The engine ECU 11 may output, to the injector 1a to be subjected to the injection, a drive signal corresponding to a fuel injection amount at a predetermined fuel injection timing. At a predetermined ignition timing, the engine ECU 11 may output, via the igniter 2, a drive signal to the ignition plug 1b that corresponds to the cylinder to be subjected to the ignition to thereby ignite the cylinder.

Figure 2:
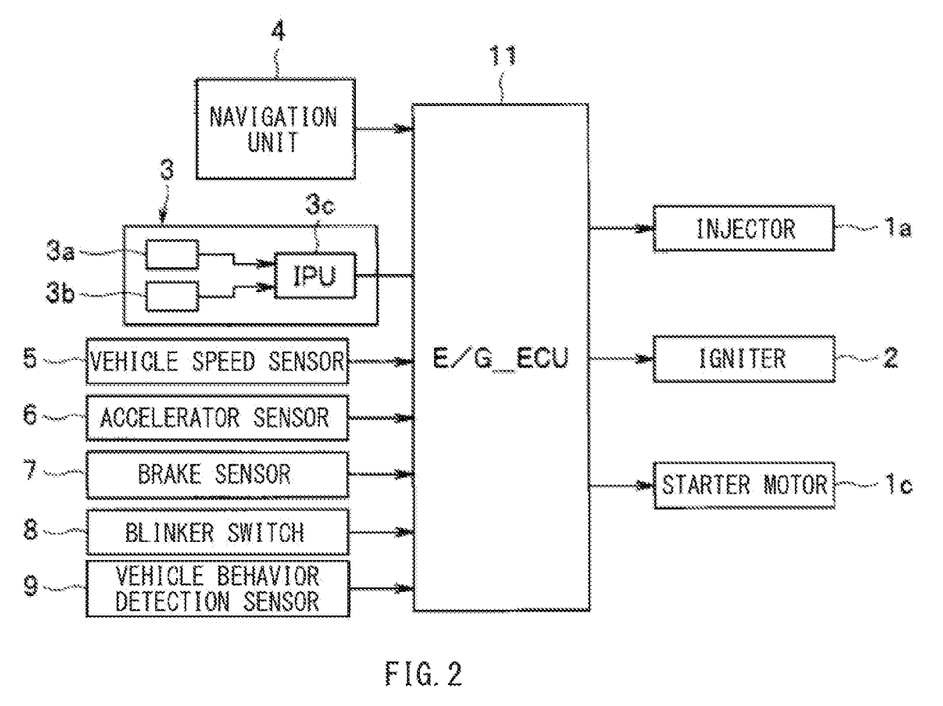
FIG. 2 is a diagram illustrating an example of a configuration of an engine control apparatus having the pre-stop idle reduction control function.

Referring to FIG. 2, the engine ECU 11 may have an input side coupled to various sensors that detect parameters necessary for executing a pre-stop idle reduction (IS) control function. The engine ECU 11 may have an output side coupled to the injector 1a, the igniter 2, and the starter motor 1c that drive the engine 1.

Non-limiting examples of the various sensors coupled to the input side of the engine ECU 11 may include: a vehicle speed sensor 5 that detects a vehicle speed VS; an accelerator sensor 6 that detects an operation of the accelerator; a brake sensor 7 that detects an operation of the brake; a blinker switch 8 operated upon turning to the right or the left to cause a blinker corresponding to a turning direction (i.e., a blinker on the right-turn side or the blinker on the left-turn side) to blink; and a vehicle behavior detection sensor 9. The vehicle behavior detection sensor 9 may detect a behavior that acts on the own vehicle M. Non-limiting examples of the vehicle behavior detection sensor 9 may include: a steering angle sensor that detects a steering angle; and a yaw rate sensor that detects a yaw rate.

The injector 1a, the igniter 2, and the starter motor 1c may be coupled to the output side of the engine ECU 11. The injector 1a may drive the engine 1. The igniter 2 may be coupled to the ignition plug 1b. The starter motor 1c may activate the engine 1. The starter motor 1c may be a motor generator.

The engine ECU 11 may determine whether conditions for the pre-stop idle reduction control are satisfied, on the basis of signals received from the vehicle-mounted camera 3 and various sensors and switches. If the engine ECU 11 determines that the conditions for the pre-stop idle reduction control are satisfied, the engine ECU 11 may stop the engine 1 by outputting a fuel cut signal to the injector 1a of the engine 1 and by further outputting an ignition cut signal to the igniter 2.

If the engine ECU 11 determines that a condition for canceling the pre-stop idle reduction control is satisfied, the engine ECU 11 may restart the engine 1 by outputting an ON signal to the starter motor 1c of the engine 1 to activate the engine 1, by outputting a fuel injection signal corresponding to a predetermined amount of fuel to the injector 1a, and by further outputting, at a predetermined timing, an ignition signal to the ignition plug 1b via the igniter 2. In one embodiment, the engine ECU 11 may serve as a "pre-stop idle reduction control unit" or a "control unit".

Figure 3:
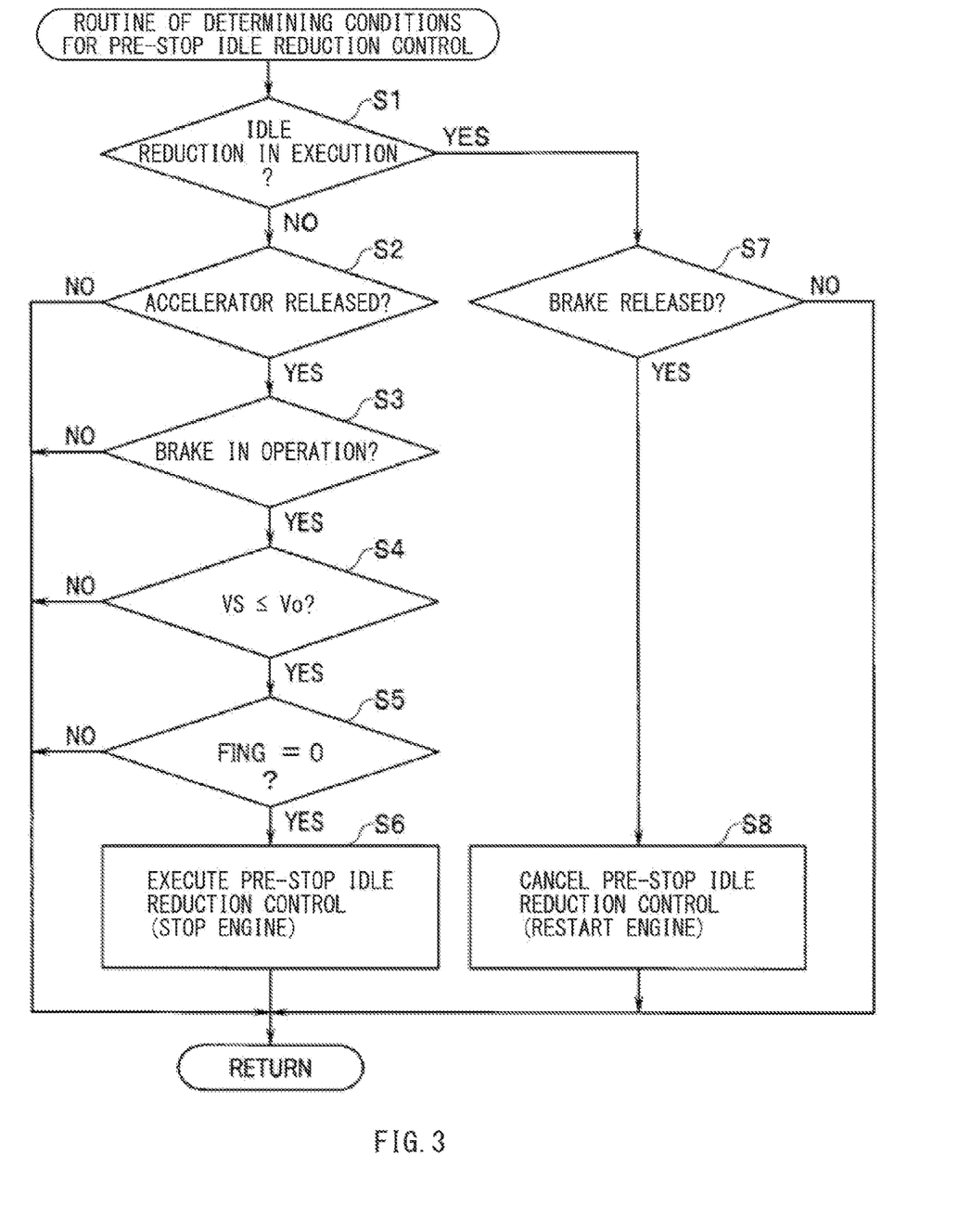
FIG. 3 is a flowchart illustrating an example of a routine of determining conditions for a pre-stop idle reduction control.

The engine ECU 11 may determine whether the conditions for the pre-stop idle reduction control are satisfied on the basis of a routine of determining the conditions for the pre-stop idle reduction control illustrated by way of example in FIG. 3. The routine may be executed for each predetermined calculation cycle after activation of a system. First, in step S1, the engine ECU 11 may determine whether an idle reduction is currently in execution. For example, whether the idle reduction is in execution may be determined by referring to a value of a flag. The flag may be set when instructions to execute the pre-stop idle reduction control are issued in later-described step S6. The flag may be cleared when the pre-stop idle reduction control is canceled in later-described step S8.

If the idle reduction is determined as being cancelled (step S1: NO), the routine may proceed to step S2. In steps S2 to S4, the engine ECU 11 may determine whether predetermined conditions for the pre-stop idle reduction control are satisfied. In one embodiment, the engine ECU 11 that performs the processes in steps S2 to S4 may serve as a "pre-stop idle reduction control condition determining unit" or a "first determining unit".

If the idle reduction is determined as being in execution (step S1: YES), the routine may proceed to step S7 to determine whether a condition for cancelling the pre-stop idle reduction control is satisfied.

First, a description is given of some examples of the conditions for the pre-stop idle reduction control in steps S2 to S4. In step S2, the engine ECU 11 may determine whether the accelerator is released by reading a signal outputted from the accelerator sensor 6. If the accelerator is determined as being released on the basis of the signal from the accelerator sensor 6 (step S2: YES), the routine may proceed to step S3. If an operation of the accelerator is determined as being detected on the basis of the accelerator sensor 6 (step S2: NO), the routine may end on the premise that the conditions for the pre-stop idle reduction control are not satisfied.

In step S3, the engine ECU 11 may determine whether the brake is in operation by reading a signal outputted from the brake sensor 7. It should be noted that the brake may encompass both a so-called foot brake and a parking brake.

If the brake is determined as not being in operation on the basis of the brake sensor 7 (step S3: NO), the routine may end on the premise that the conditions for the pre-stop idle reduction control are not satisfied. If an operation of the brake is determined as being detected on the basis of the brake sensor 7 (step S3: YES), the routine may proceed to step S4.

In step S4, the engine ECU 11 may compare the vehicle speed Vs detected by the vehicle speed sensor 5 with a pre-stop idle reduction determining threshold Vo. The pre-stop idle reduction determining threshold Vo may be a vehicle speed threshold for a determination as to whether to execute the pre-stop idle reduction control, and may be a predetermined fixed value such as 8 [Km/h] or 15 [Km/h]. If the vehicle speed Vs is determined as being greater than the pre-stop idle reduction determining threshold Vo (VS>Vo) (step S4: NO), the routine may end on the premise that the conditions for the pre-stop idle reduction control are not satisfied. If the vehicle speed Vs is determined as being equal to or less than the pre-stop idle reduction determining threshold Vo (VS≤Vo) (step S4: YES), the routine may proceed to step S5.

In a case where the routine has proceeded to step S5 on the premise that all of the conditions for the pre-stop idle reduction control in steps S2 to S4 are determined as being satisfied, the engine ECU 11 may check a value of the pre-stop idle reduction control prohibition flag FING. If the value of the pre-stop idle reduction control prohibition flag FING is zero (FING=0) indicating that the pre-stop idle reduction control is permitted (step S5: YES), the routine may proceed to step S6. If the value of the pre-stop idle reduction control prohibition flag FING is one (FING=1) indicating that the pre-stop idle reduction control is prohibited (step S5: NO), the routine may end. It should be noted that the value of the pre-stop idle reduction control prohibition flag FING may be set by a routine of determining conditions for prohibiting the pre-stop idle reduction control to be described later.

In step S6, the engine ECU 11 may issue the instructions to execute the pre-stop idle reduction control, following which the routine may end. Accordingly, the engine ECU 11 may stop outputting both of the fuel injection signal for the injector 1a of the engine 1 and the ignition signal for the ignition plug 1b to stop the engine 1.

Accordingly, in a case where the pre-stop idle reduction control prohibition flag FING is determined as being set in step S5 (FING=1) even when the conditions for the pre-stop idle reduction control in steps S2 to S4 described above are satisfied, the execution of the pre-stop idle reduction control may be prohibited and a state of operation of the engine 1 may be continued. In some embodiments, the conditions for the pre-stop idle reduction control may include a coolant temperature detected by a coolant temperature sensor and/or a battery voltage detected by a battery voltage sensor. In such alternative embodiments, the routine may end without proceeding to step S6 on the premise that the conditions for the pre-stop idle reduction control are not satisfied, in a case where the coolant temperature is equal to or less than a warmup temperature or the battery voltage is equal to or less than a predetermined voltage.

If the idle reduction is determined as being in execution (step S1: YES), the routine may proceed to step S7. In step S7, the engine ECU 11 may determine a condition for cancelling the pre-stop idle reduction control on the basis of an output value of the brake sensor 7. If a release of the brake is determined as being detected on the basis of the brake sensor 7 (step S7: YES), the routine may proceed to step S8. In step S8, the engine ECU 11 may cancel the pre-stop idle reduction control and may restart the engine 1, following which the routine may end. If an operation of the brake is determined as being detected on the basis of the brake sensor 7 (step S7: NO), the routine may end and the engine ECU 11 may continue the pre-stop idle reduction control.

Upon restarting the engine 1, the engine ECU 11 may cause the starter motor 1*c* to activate the engine 1, and may resume the fuel injection from the injector 1*a*. The engine ECU 11 may also cause the igniter 2 to resume the output of the ignition signal to the ignition plug 1*b* of each of the cylinders.

The engine ECU 11 may also set a value of the pre-stop idle reduction control prohibition flag FING to be read in step S5 described above. The value of the pre-stop idle reduction control prohibition flag FING may be set on the basis of the routine of determining conditions for prohibiting the pre-stop idle reduction control illustrated by way of example in FIGS. 4 and 5.

Figure 4:
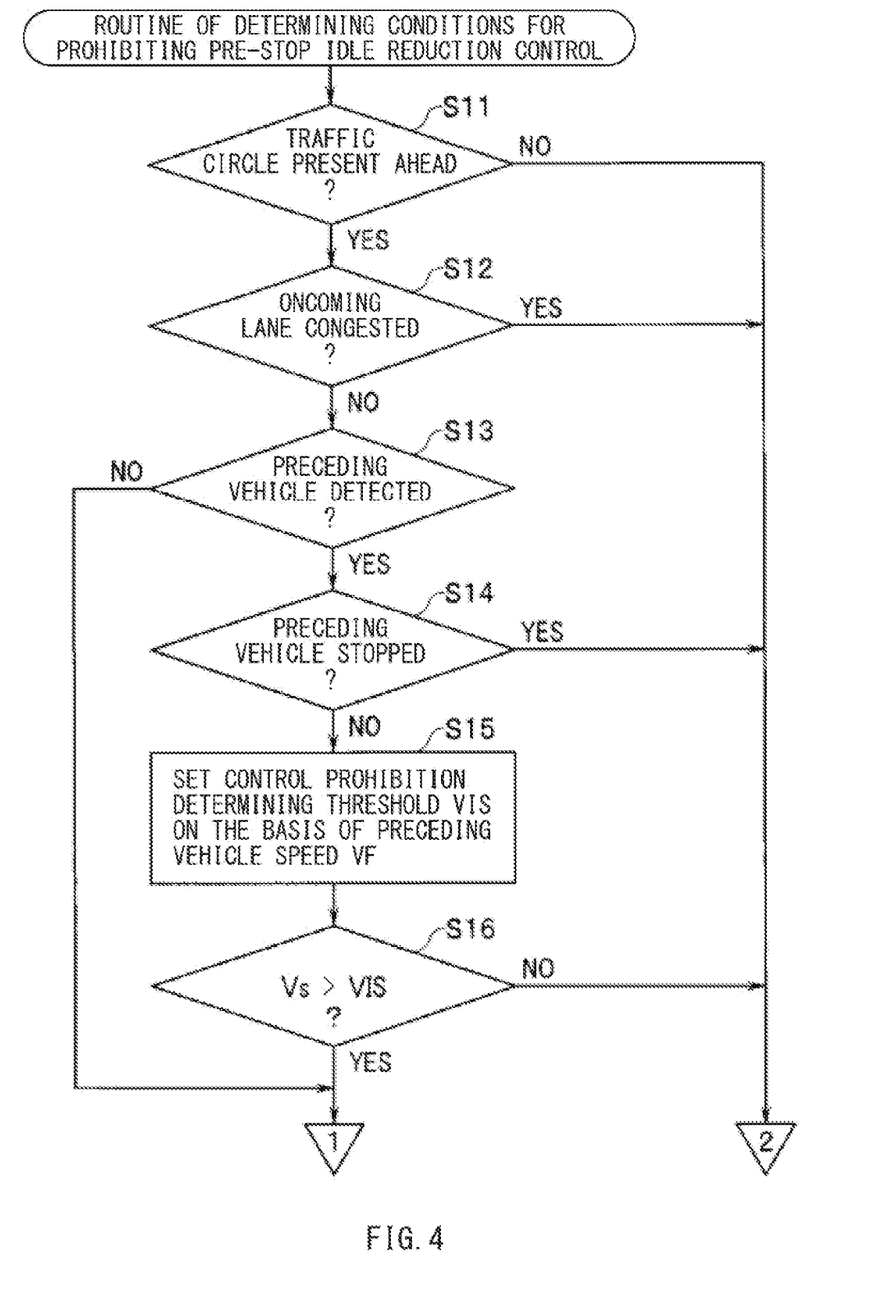
FIG. 4 is a first flowchart illustrating a routine of determining conditions for prohibiting the pre-stop idle reduction control.

In the routine of determining conditions for prohibiting the pre-stop idle reduction control, the engine ECU 11 may first determine, in step S11, whether a traffic circle or a roundabout is detected at a traveling road ahead of the own vehicle M. In one embodiment, the engine ECU 11 that performs the process in step S11 may serve as a "traffic circle detecting unit" or a "detecting unit".

Referring to FIGS. 7 to 10, the traffic circle joins together three or more intersecting roads (four-way road in the drawings) via a circular road positioned in the middle of the traffic circle, and is provided with no traffic lights. At the traffic circle, the own vehicle M enters the circular road at a reduced speed and travels in a certain direction to branch toward an intended road. It should be noted that the roads are based on the left-side driving and the circular road is a one-way road in a clockwise direction in FIGS. 7 to 10. Accordingly, the own vehicle M travels in a counterclockwise direction at the circular road for the roads that are based on the right-side driving.

The traffic circle may be extracted from a road shape recognized on the basis of data on a traveling environment ahead of the own vehicle M acquired by the imaging performed by the vehicle-mounted camera 3. In some embodiments, the traffic circle may be recognized on the basis of the data on the traveling environment acquired by the imaging, performed by the vehicle-mounted camera 3, of a road sign that indicates the traffic circle illustrated in FIGS. 7 to 10. In some embodiments, the presence of the traffic circle may be recognized from the road map database provided in the navigation unit 4. In some embodiments, data on the traffic circle may be acquired by a road-to-vehicle communication.

Figure 5:
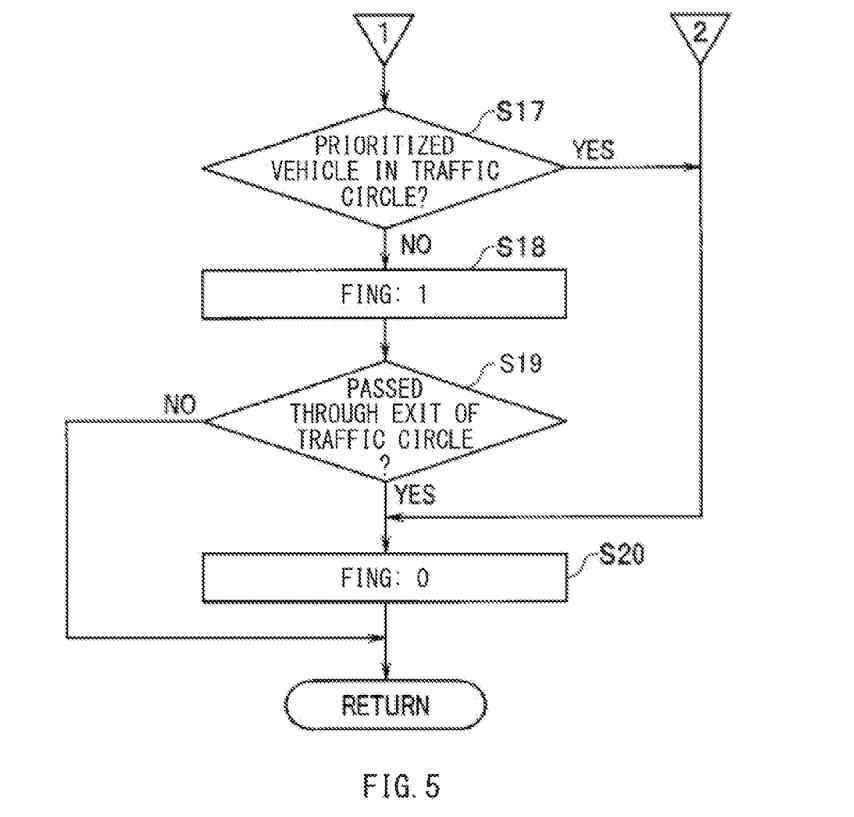
FIG. 5 is a second flowchart illustrating a routine of determining the conditions for prohibiting the pre-stop idle reduction control.

If the traffic circle is determined as being present (step S11: YES), the routine may proceed to step S12. In steps S12 to S17 and S19, the engine ECU 11 may perform a determination on the prohibition of the pre-stop idle reduction control. If the traffic circle is determined as not being detected (step S11: NO), the routine may proceed to step S20. In one embodiment, the engine ECU 11 that performs the processes in steps S12 to S17 and S19 may serve as a "pre-stop idle reduction control prohibition condition determining unit" or a "second determining unit". In some embodiments, the engine ECU 11 may determine that the conditions for prohibiting the pre-stop idle reduction control are satisfied in a case where one or more of the following example conditions are satisfied.

Figure 8:
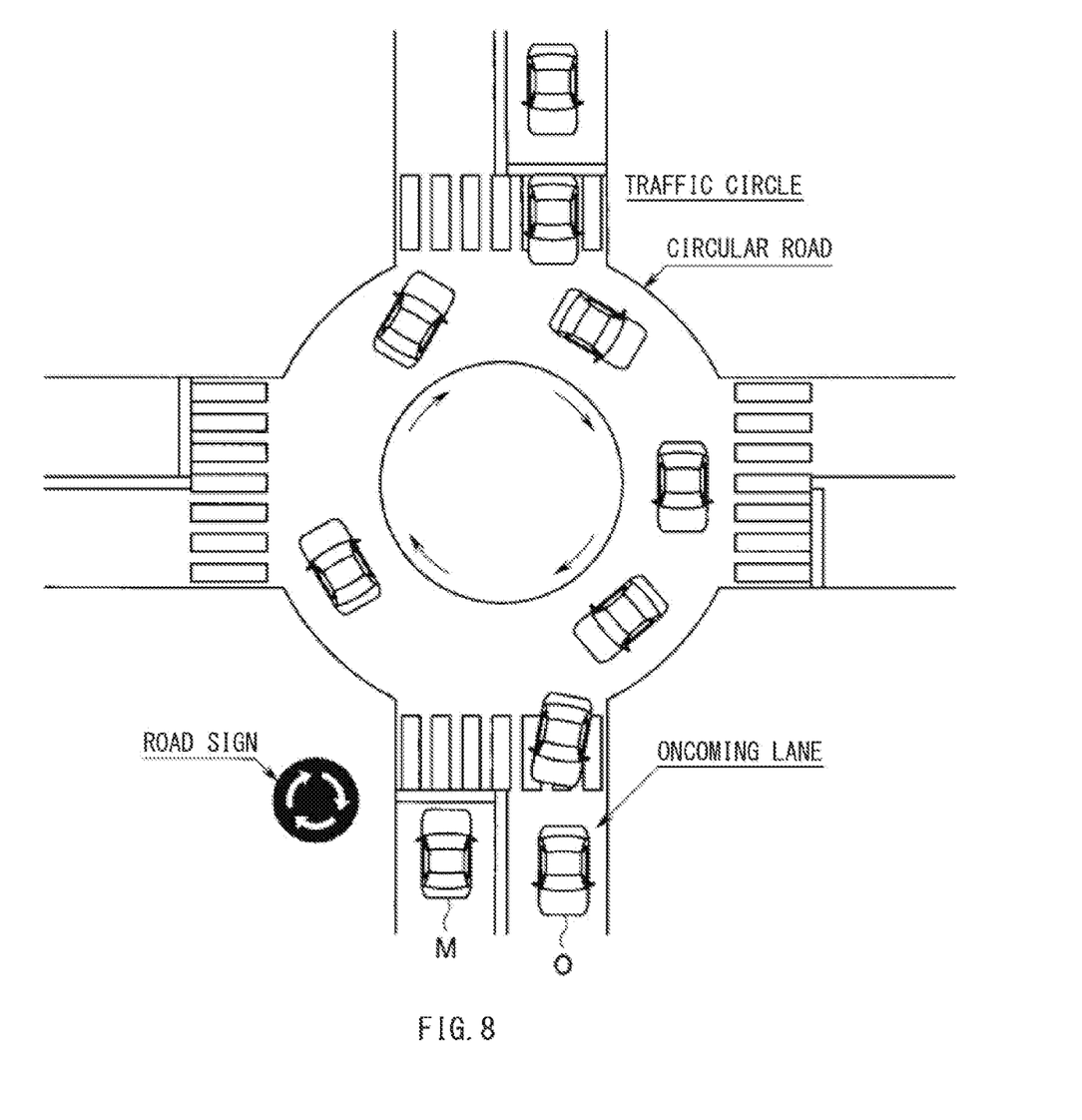
FIG. 8 is a diagram illustrating a state in which an oncoming lane coupled to the traffic circle is congested.

In step S12, the engine ECU 11 may determine whether an oncoming lane is congested. Referring to FIG. 8, it is possible to estimate that, in a case where an oncoming lane is congested, the circular road joined to the oncoming lane is congested as well. In one embodiment, the engine ECU 11 that performs the process in step S12 may serve as an "oncoming vehicle traveling data acquiring unit" or a "third data acquiring unit".

The engine ECU 11 may determine whether the oncoming lane is congested on the basis of traveling data acquired on the basis of the data on the traveling environment ahead of the own vehicle M acquired by the imaging performed by the vehicle-mounted camera 3. For example, the traveling data may relate to a traveling speed of an oncoming vehicle O or a line of oncoming vehicles O. In some embodiments, the traveling data may be acquired on the basis of a road-to-vehicle communication between a roadside device provided in the vicinity of the oncoming lane and the own vehicle M, or on the basis of a vehicle-to-vehicle communication between the oncoming vehicle O and the own vehicle M. In some embodiments, the traveling data may be acquired through an access to any external road traffic information facility via, for example, the Internet to determine whether the oncoming lane is congested.

If the oncoming lane is determined as being congested (step S12: YES), the routine may proceed to step S20. If a flow of the oncoming vehicle O is determined as being smooth (step S12: NO), the routine may proceed to step S13. In step S13, the engine ECU 11 may determine presence of a preceding vehicle F that travels in front of the own vehicle M and tries to enter the circular road.

Figure 9:
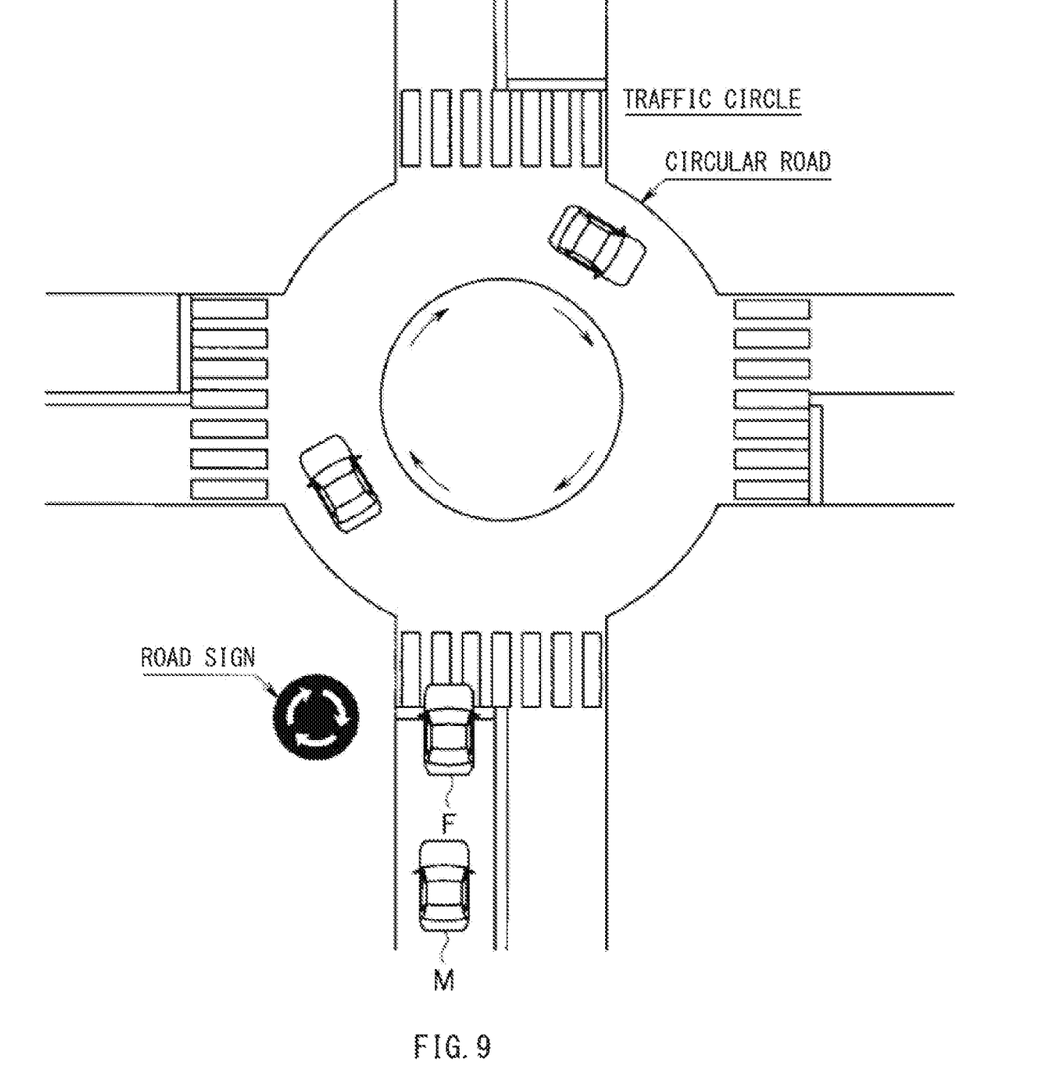
FIG. 9 is a diagram illustrating a state in which a preceding vehicle that tries to enter the traffic circle is detected ahead of the own vehicle.

The engine ECU 11 may determine whether the preceding vehicle F is present in front of the own vehicle M on the basis of the data on the traveling environment ahead of the own vehicle M acquired by the imaging performed by the vehicle-mounted camera 3. In some embodiments, the data on the traveling environment may be acquired on the basis of a vehicle-to-vehicle communication between the preceding vehicle F and the own vehicle M. In some embodiments, the data on the traveling environment may be acquired on the basis of a road-to-vehicle communication between a roadside device provided in the vicinity of the traffic circle and the own vehicle M.

Figure 7:
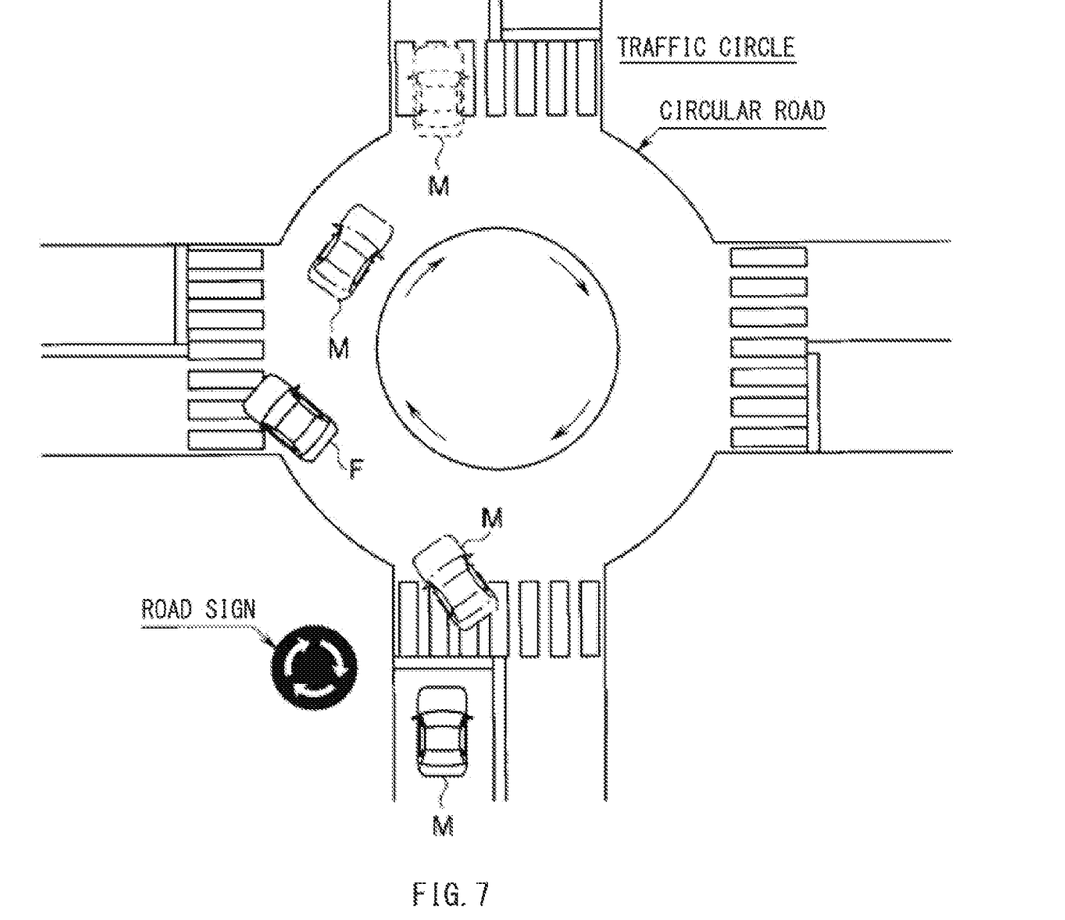
FIG. 7 is a diagram illustrating a state in which an own vehicle enters a traffic circle.

If the preceding vehicle F that tries to enter the circular road is determined as not being detected (step S13: NO) as illustrated in FIG. 7, the routine may proceed to step S17. If the own vehicle M is determined as so traveling as to follow the preceding vehicle F that tries to enter the circular road (step S13: YES), the routine may proceed to step S14. In step S14, the engine ECU 11 may determine whether the preceding vehicle F is stopped in front of the circular road.

The engine ECU 11 may determine whether the preceding vehicle F is stopped by calculating a preceding vehicle speed VF on the basis of a relative vehicle speed between the own vehicle M and the preceding vehicle F. The relative vehicle speed may be calculated on the basis of data on the preceding vehicle F acquired by the vehicle-mounted camera 3. In some embodiments, the data on whether the preceding vehicle F is stopped may be acquired on the basis of a vehicle-to-vehicle communication between the preceding vehicle F and the own vehicle M. In some embodiments, the data on whether the preceding vehicle F is stopped may be acquired on the basis of a road-to-vehicle communication between a roadside device provided in the vicinity of the traffic circle and the own vehicle M.

If the preceding vehicle F is determined as being stopped (step S14: YES), the routine may proceed to step S20. One reason is that it is possible to estimate that the own vehicle M is likely to stop in such a manner as to follow the preceding vehicle F. If the preceding vehicle F is determined as traveling (step S14: NO), the routine may proceed to step S15. One reason is that it is possible to estimate that the own vehicle M is likely to enter the circular road in such a manner as to follow the preceding vehicle F without involving a stop, or that the own vehicle M is likely to restart immediately even when the own vehicle M has stopped upon entering the circular road.

Figure 6:
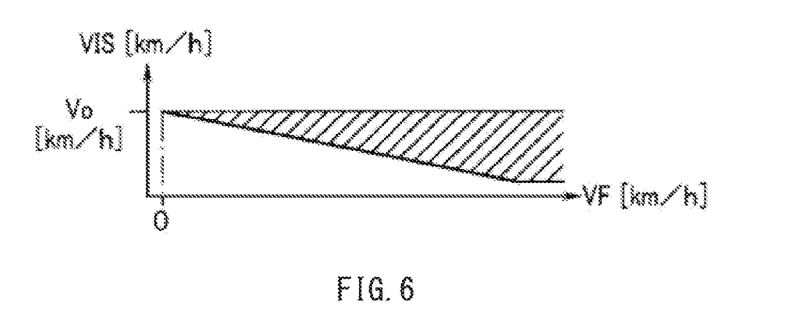
FIG. 6 is a conceptual diagram illustrating a table of a threshold for determining the prohibition of the pre-stop idle reduction control.

In step S15, the engine ECU 11 may set a threshold for determining the prohibition of the pre-stop idle reduction control (hereinafter referred to as a "control prohibition determining threshold") VIS, on the basis of the preceding vehicle speed VF. Referring to FIG. 6, the control prohibition determining threshold VIS may be set to the same value as the pre-stop idle reduction determining threshold Vo in a case where the preceding vehicle speed VF is 0 [Km/h]. The control prohibition determining threshold VIS may be set to a gradually lower value as the preceding vehicle speed VF becomes higher. Accordingly, a hatched region illustrated in FIG. 6 may correspond to a control prohibited region.

The engine ECU 11 may stop the engine 1 promptly in a case where the vehicle speed Vs is equal to or less than the pre-stop idle reduction determining threshold Vo. One reason is that the own vehicle M decelerates by the brake operation and thus a distance between the own vehicle M and the preceding vehicle F is shortened in a case where the preceding vehicle speed VF is 0 [Km/h], i.e., in a case where the preceding vehicle F is determined as being stopped. It should be noted that a possibility of stopping of the own vehicle M is low in a case where the preceding vehicle speed VF is high. One reason is that the distance between the own vehicle M and the preceding vehicle F simply increases even if the own vehicle speed VS is reduced by the brake operation in a case where the preceding vehicle speed VF is high. Accordingly, the control prohibition determining threshold VIS may be set to a lower value as the preceding vehicle speed VF is higher. In some embodiments, the control prohibition determining threshold VIS may be calculated from a predetermined arithmetic expression, on the basis of the preceding vehicle speed VF.

The above configuration thus helps to make it difficult for the pre-stop idle reduction control to be executed even in a case where the own vehicle M has entered the traffic circle at a very low speed by operating the brake and travels the circular road at a low speed while performing the brake operation and the accelerator operation. This in turn helps to reduce clumsiness to be felt by the driver which can occur as a result of repeating the stop of the engine 1 and the restart of the engine 1, and also to improve the deterioration in the fuel consumption which can occur as a result of repeating the restart of the engine 1. In one embodiment, the engine ECU 11 that performs the processes in steps S13 to S15 may serve as a "pre-stop idle reduction control prohibition determining threshold setting unit" or a "setting unit".

In step S16, the engine ECU 11 may compare the vehicle speed Vs with the control prohibition determining threshold VIS. If the vehicle speed Vs is determined as being greater than the control prohibition determining threshold VIS (VS>VIS) (step S16: YES), the routine may proceed to step S17. In step S17, the engine ECU 11 may determine whether a prioritized vehicle P travels the circular road of the traffic circle. In one embodiment, the engine ECU 11 that performs the process in step S17 may serve as a "prioritized vehicle recognizing unit" or a "recognizing unit".

Figure 10:
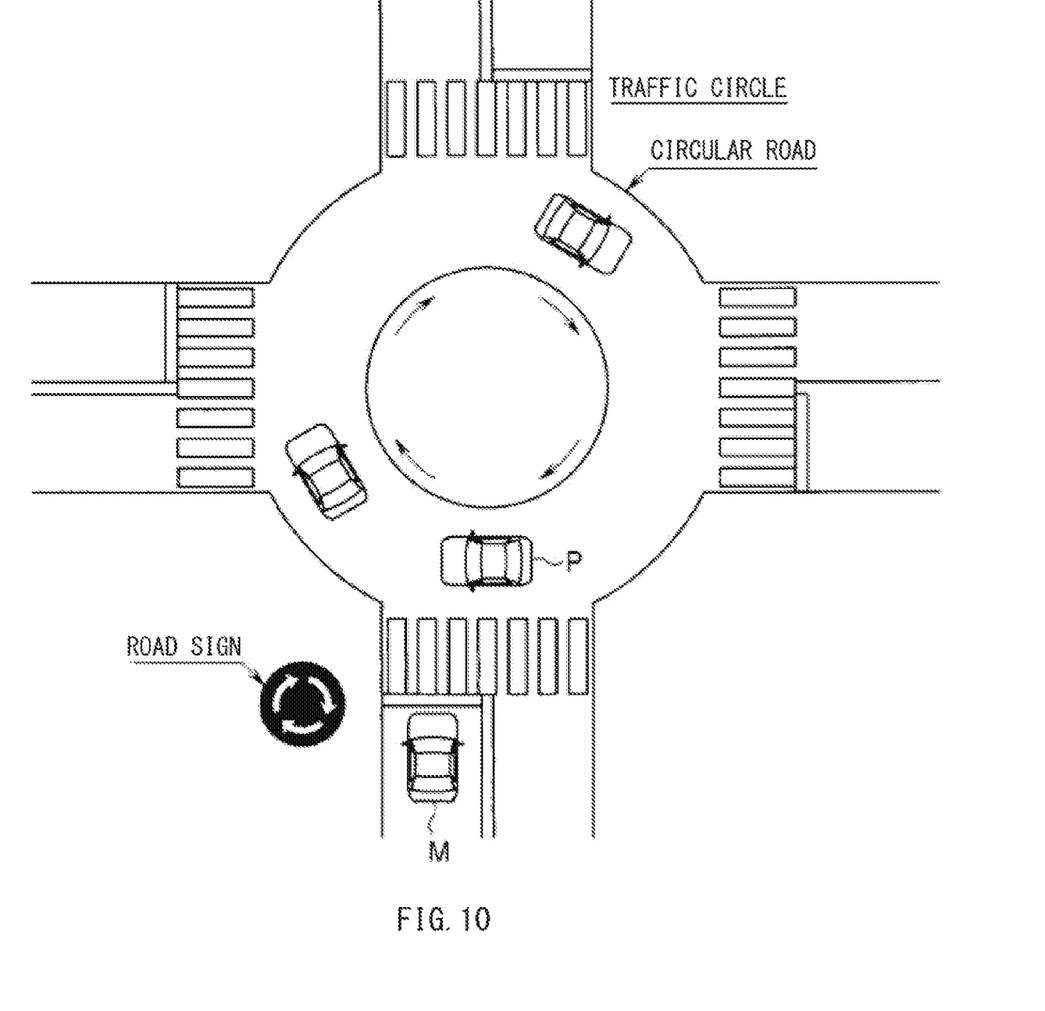
FIG. 10 is a diagram illustrating a state in which a prioritized vehicle travels a circular road of the traffic circle which the own vehicle tries to enter.

Referring to FIG. 10, in a case where a vehicle approaching the own vehicle M travels the circular road when the own vehicle M tries to enter the circular load, it is desirable that the approaching vehicle be set as the prioritized vehicle P and that the own vehicle M enter the circular load after confirming the passage of the prioritized vehicle P.

The engine ECU 11 may determine whether the prioritized vehicle P travels the circular road on the basis of the data on the traveling environment of the circular road acquired by the imaging performed by the vehicle-mounted camera 3. If the prioritized vehicle P that travels the circular road is determined as not being detected (step S17: NO), the routine may proceed to step S18 on the premise that the own vehicle M is able to enter the circular road at a reduced speed without involving a stop. If the prioritized vehicle P is determined as being detected (step S17: YES), the routine may proceed to step S20 on the premise that it is necessary for the own vehicle M to stop and wait for the prioritized vehicle P to pass.

For example, the prioritized vehicle P may be detected by calculating a time required for the approaching vehicle to reach the own vehicle M, on the basis of a vehicle speed of the approaching vehicle that travels the circular road and a relative distance between the approaching vehicle and the own vehicle M (the approaching time=the relative distance/the approaching vehicle speed). Further, the thus-calculated approaching time may be compared with an entry possible time. If the approaching time is less than the entry possible time (the approaching time<the entry possible time), the approaching vehicle may be set as the prioritized vehicle P. If the approaching time is equal to or greater than the entry possible time (the approaching time≥the entry possible time), the prioritized vehicle P is determined as being absent. One reason is that the own vehicle M is able to enter the circular road before the approaching vehicle reaches the own vehicle M. It should be noted that the entry possible time is a time related to a timing required for the own vehicle M to be able to enter the circular road and travel along a flow of vehicles present at the front and the rear of the own vehicle M, and may be set on the basis of the own vehicle speed VS upon the entry to the circular road.

In step S18, the engine ECU 11 may set the pre-stop idle reduction control prohibition flag FING (FING: 1) on the premise that the conditions for prohibiting the pre-stop idle reduction control are satisfied, following which the routine may proceed to step S19.

In step S19, the engine ECU 11 may determine whether the own vehicle M has passed through an exit of the traffic circle. The engine ECU 11 may detect whether the own vehicle M has passed through the exit of the traffic circle from a recognition of a road shape, on the basis of the data on the traveling environment ahead of the own vehicle M acquired by the imaging performed by the vehicle-mounted camera 3. In some embodiments, the exit of the traffic circle may be extracted from the road map database provided in the navigation unit 4. In some embodiments, data on the exit of the traffic circle may be acquired on the basis of a road-to-vehicle communication between a roadside device provided in the vicinity of the exit of the traffic circle and the own vehicle M. In some embodiments, the own vehicle M may be determined as having passed through the exit of the traffic circle when the blinker switch 8 is turned off after the blinker switch 8 is once turned on in a direction of the course change, in a case where the blinker switch 8 is an alternate blinker. In some embodiments, the own vehicle M may be determined as having passed through the exit of the traffic circle when a steering wheel steered in a steering increase direction is detected by a steering angle sensor as being steered back to a neutral position, in a case where the own vehicle M is provided with the steering angle sensor.

If the own vehicle M is determined as traveling the circular road and not having passed through the exit of the traffic circle yet (step S19: NO), the routine may end as it is. Accordingly, a state in which the pre-stop idle reduction control prohibition flag FING is set (FING=1) may be maintained during the traveling of the own vehicle M along the circular road.

If the own vehicle M is determined as having passed through the exit of the traffic circle as denoted by a broken line in FIG. 7 (step S19: YES), the routine may proceed to step S20.

The routine may proceed to step S20 from one of the steps S11, S12, S14, S16, S17, and S19. In step S20, the engine ECU 11 may clear the pre-stop idle reduction control prohibition flag FING (FING: 0) on the premise that the conditions for prohibiting the pre-stop idle reduction control are not satisfied, following which the routine may end.

The value of the pre-stop idle reduction control prohibition flag FING set in step S18 or S20 may be read in step S5 of the routine illustrated in FIG. 3. If the pre-stop idle reduction control prohibition flag FING is cleared (FING=0) (step S5: YES), the routine may proceed to step S6 from step S5. In step S6, the engine ECU 11 may execute the pre-stop idle reduction control and the engine 1 may be stopped.

If the pre-stop idle reduction control prohibition flag FING is set (FING=1) (step S5: NO), the routine may end without proceeding to step S6 from step S5. Accordingly, a state in which the pre-stop idle reduction control is prohibited may be maintained.

Accordingly, the engine 1 is prevented from stopping even when the own vehicle speed VS is decelerated to a very low speed by the brake operation during the traveling along the circular load following the entry of the own vehicle M to the circular road, as denoted by a dashed-dotted line in FIG. 7.

According to an example embodiment described above, the idle reduction control is executed and the engine 1 is stopped in a case where the predetermined conditions for the pre-stop idle reduction control are satisfied, upon a normal traveling of the own vehicle M that has the pre-stop idle reduction control function. Further, the pre-stop idle reduction control is configured to be prohibited in a case where the own vehicle M enters the traffic circle and travels the circular road. Thus, a situation in which the stop of the engine 1 and the restart of the engine 1 are repeated more than necessary is reduced even in a case where the own vehicle M enters the traffic circle at a very low speed by operating the brake and travels the circular road at a very low speed while adjusting the brake operation and the accelerator operation. Hence, it helps to prevent the driver from experiencing the clumsiness or a sense of discomfort, and to prevent the driver from feeling slow upon the restart. It also helps to allow the own vehicle M to smoothly enter the traffic circle and travel the circular road.

Further, the stop of the engine 1 and the restart of the engine 1 are not repeated more than necessary upon entering the traffic circle and traveling the circular road. Hence, it helps to reduce a delay in start of the own vehicle M resulting from the restart of the engine 1 and a deterioration in the battery and the starter motor. It also helps to improve the deterioration in fuel consumption resulting from an increased amount of injection upon the start of the engine 1.

Although some example embodiments of the technology have been described in the foregoing by way of example with reference to the accompanying drawings, the technology is by no means limited to the embodiments described above. It should be appreciated that modifications and alterations may be made by persons skilled in the art without departing from the scope as defined by the appended claims. The technology is intended to include such modifications and alterations in so far as they fall within the scope of the appended claims or the equivalents thereof.

For example, in a case where the driver performs the accelerator operation and the brake operation of the own vehicle M, the accelerator sensor 6 may be an accelerator switch of an always-OFF type which is turned on when the accelerator pedal is pressed, and the brake sensor 7 may be a brake switch of an always-OFF type which is turned on when the brake pedal is pressed.

The engine ECU 11 illustrated in FIGS. 1 and 2 is implementable by circuitry including at least one semiconductor integrated circuit such as at least one processor (e.g., a central processing unit (CPU)), at least one application specific integrated circuit (ASIC), and/or at least one field programmable gate array (FPGA). At least one processor is configurable, by reading instructions from at least one machine readable non-transitory tangible medium, to perform all or a part of functions of the engine ECU 11. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the nonvolatile memory may include a ROM and a NVRAM. The ASIC is an integrated circuit (IC) customized to perform, and the FPGA is an integrated circuit designed to be configured after manufacturing in order to perform, all or a part of the functions of the engine ECU 11 illustrated in FIGS. 1 and 2.

The invention claimed is:

1. An engine idle reduction control apparatus to be applied to a vehicle, the engine idle reduction control apparatus comprising:
   a memory; and
   a controller coupled with the memory, and configured to be coupled with an accelerator sensor, a brake sensor and a speed sensor installed in the vehicle, the controller configured to:
   acquire, as traveling environment data, data on a traveling environment ahead of the vehicle using at least an image captured by a camera, a road map database provided in a navigator, and a road-to-vehicle communication,
   detect a traffic circle or a roundabout, on a basis of the traveling environment data acquired,
   determine whether a control condition which is predetermined for a pre-stop idle reduction control that stops an engine of the vehicle before the vehicle stops is satisfied using information detected from the accelerator sensor, the brake sensor and the speed sensor, and
   stop the engine of the vehicle, when the control condition is satisfied;
   wherein the controller is configured to:
   determine a prohibition condition that the pre-stop idle reduction control is prohibited is satisfied, at least when the controller detects the traffic circle or the roundabout on a road where the vehicle travels ahead of the vehicle, and
   continue operating the engine even in a case where the control condition is satisfied, on a condition that the prohibition condition is satisfied.

2. The engine idle reduction control apparatus according to claim 1, wherein the controller is further configured to:
   set a threshold on a basis of a vehicle speed of a preceding vehicle with respect to the vehicle, the threshold being set to a lower value as the vehicle speed of the preceding vehicle is higher, wherein
determine that the prohibition condition is satisfied in a case where:
the preceding vehicle that enters the traffic circle is detected on a basis of at least the data acquired on the traveling environment ahead of the vehicle, and
a vehicle speed of the vehicle following the preceding vehicle exceeds the threshold set.

3. The engine idle reduction control apparatus according to claim 1, wherein the controller is further configured to determine that the prohibition condition is satisfied, in a case where the vehicle is determined to be traveling at least the traffic circle detected.

4. The engine idle reduction control apparatus according to claim 2, wherein the controller is further configured to-determine that the prohibition condition is satisfied, in a case where the vehicle is determined to be traveling at least the traffic circle detected.

5. The engine idle reduction control apparatus according to claim 1, wherein the controller is further configured to recognize a prioritized vehicle that travels a circular road of the traffic circle, on a basis of the traveling environment data acquired, wherein
determine that the prohibition condition is not satisfied, in a case where the prioritized vehicle is recognized.

6. The engine idle reduction control apparatus according to claim 2, wherein the controller is further configured to recognize a prioritized vehicle that travels a circular road of the traffic circle, on a basis of the traveling environment data acquire, wherein
determine that the prohibition condition is not satisfied, in a case where the prioritized vehicle is recognized.

7. The engine idle reduction control apparatus according to claim 3, wherein the controller is further configured to recognize a prioritized vehicle that travels a circular road of the traffic circle, on a basis of the traveling environment data acquired, wherein
determine that the prohibition condition is not satisfied, in a case where the prioritized vehicle is recognized.

8. The engine idle reduction control apparatus according to claim 1, wherein the controller is further configured to:
acquire traveling data of an oncoming vehicle with respect to the vehicle, on a basis of the traveling environment data acquired, and
determine that the prohibition condition is not satisfied, in a case where a congestion of an oncoming lane along which the oncoming vehicle travels is detected on a basis of at least the traveling data of the oncoming vehicle.

9. The engine idle reduction control apparatus according to claim 2, wherein the controller is further configured to:
acquire traveling data of an oncoming vehicle with respect to the vehicle, on a basis of the traveling environment data acquired, and
determine that the prohibition condition is not satisfied, in a case where a congestion of an oncoming lane along which the oncoming vehicle travels is detected on a basis of at least the traveling data of the oncoming vehicle.

10. The engine idle reduction control apparatus according to claim 3, wherein the controller is further configured to:
acquire traveling data of an oncoming vehicle with respect to the vehicle, on a basis of the traveling environment data acquired, and
determine that the prohibition condition is not satisfied, in a case where a congestion of an oncoming lane along which the oncoming vehicle travels is detected on a basis of at least the traveling data of the oncoming vehicle.

11. The engine idle reduction control apparatus according to claim 4, wherein the controller is further configured to:
acquire traveling data of an oncoming vehicle with respect to the vehicle, on a basis of the traveling environment data acquired, and
determine that the prohibition condition is not satisfied, in a case where a congestion of an oncoming lane along which the oncoming vehicle travels is detected on a basis of at least the traveling data of the oncoming vehicle.

12. The engine idle reduction control apparatus according to claim 5, wherein the controller is further configured to:
acquire traveling data of an oncoming vehicle with respect to the vehicle, on a basis of the traveling environment data acquired, and
determine that the prohibition condition is not satisfied, in a case where a congestion of an oncoming lane along which the oncoming vehicle travels is detected on a basis of at least the traveling data of the oncoming vehicle.

13. The engine idle reduction control apparatus according to claim 6, wherein the controller is further configured to:
acquire traveling data of an oncoming vehicle with respect to the vehicle, on a basis of the traveling environment data acquired, and
determine that the prohibition condition is not satisfied, in a case where a congestion of an oncoming lane along which the oncoming vehicle travels is detected on a basis of at least the traveling data of the oncoming vehicle.

14. The engine idle reduction control apparatus according to claim 7, wherein the controller is further configured to:
acquire traveling data of an oncoming vehicle with respect to the vehicle, on a basis of the traveling environment data acquired, and
determine that the prohibition condition is not satisfied, in a case where a congestion of an oncoming lane along which the oncoming vehicle travels is detected on a basis of at least the traveling data of the oncoming vehicle.

15. The engine idle reduction control apparatus according to claim 8, wherein the controller is further configured to:
acquire traveling data of an oncoming vehicle with respect to the vehicle, on a basis of the traveling environment data acquired, and
determine that the prohibition condition is not satisfied, in a case where a congestion of an oncoming lane along which the oncoming vehicle travels is detected on a basis of at least the traveling data of the oncoming vehicle.

16. An engine idle reduction control apparatus to be applied to a vehicle, the engine idle reduction control apparatus comprising:
a detector including a sensor and configured to acquire, as traveling environment data, data on a traveling environment ahead of the vehicle using at least an image captured by a camera, a road map database provided in a navigator, and a road-to-vehicle communication; and
circuitry configured to:
detect a traffic circle or a roundabout, on a basis of the traveling environment data acquired by the detector,
determine whether a predetermined control condition for a pre-stop idle reduction control that stops an engine of the vehicle before the vehicle stops is satisfied using information detected from an accelerator sensor, a brake sensor and a speed sensor, upon detecting the traffic circle or the roundabout, determine a prohibition condition that the pre-stop idle reduction control is prohibited is satisfied, at least when the controller detects the traffic circle or the roundabout on a road where the vehicle travels ahead of the vehicle, and upon determining the control condition and the prohibition condition are both satisfied, continue operating the engine.

* * * * *